United States Patent [19]

DeLeu

[11] 4,338,036
[45] Jul. 6, 1982

[54] TAPERED BUSHING AND HUB ASSEMBLY FOR SHEAVES, GEARS, SPROCKETS, COUPLINGS AND SIMILAR MACHINE ELEMENTS

[75] Inventor: Robert P. DeLeu, South Bend, Ind.

[73] Assignee: Reliance Electric Company, Mishawaka, Ind.

[21] Appl. No.: 108,635

[22] Filed: Dec. 31, 1979

[51] Int. Cl.³ .............................. F16D 1/06; F16B 3/00
[52] U.S. Cl. ..................................... 403/16; 403/356; 403/370; 403/371
[58] Field of Search .......................... 308/236, 18, 37; 403/16, 356

[56] References Cited

U.S. PATENT DOCUMENTS

| | | | |
|---|---|---|---|
| 2,377,046 | 5/1945 | Siegerist | 403/356 |
| 2,381,697 | 8/1945 | Shepard | 403/16 |
| 2,556,151 | 6/1951 | Bremer | 403/356 |
| 2,835,518 | 5/1958 | Naab | 403/16 |

Primary Examiner—William D. Martin, Jr.
Attorney, Agent, or Firm—Marmaduke A. Hobbs

[57] ABSTRACT

A tapered bushing and hub assembly for mounting on shafts sheaves, gears, sprockets, couplings and similar machine elements, in which a tapered, split bushing is inserted in a tapered bore in the machine element and a plurality of lugs secured by screws onto the hub force the bushing inwardly into the tapered bore, seating the bushing into face-to-face contact with the tapered surface of the hub and contracting the bushing firmly onto the shaft. Holes for the screws are provided in the hub and are arranged parallel with the axis of the bore, and preferably extend through the hub. Each lug bears against the side of the hub and the large end of the bushing as the screws are tightened into their respective holes. When the machine element is to be removed from the shaft, a lug may be secured by the screws on the opposite side of the hub to force the bushing outwardly from the tapered bore.

9 Claims, 6 Drawing Figures

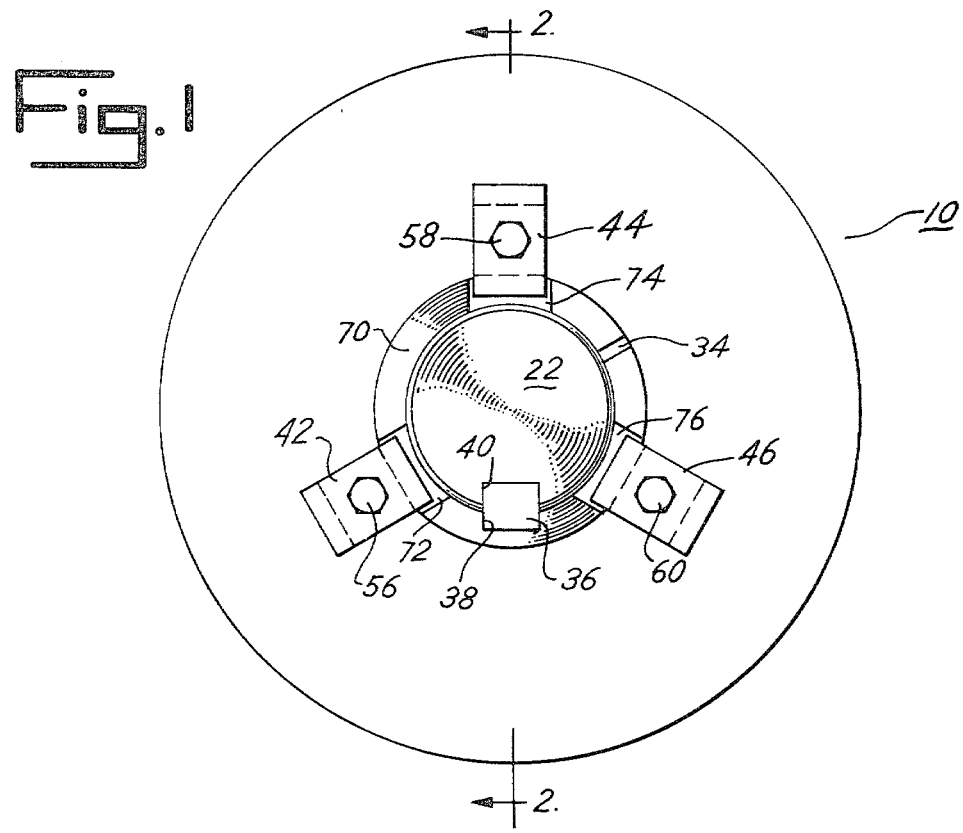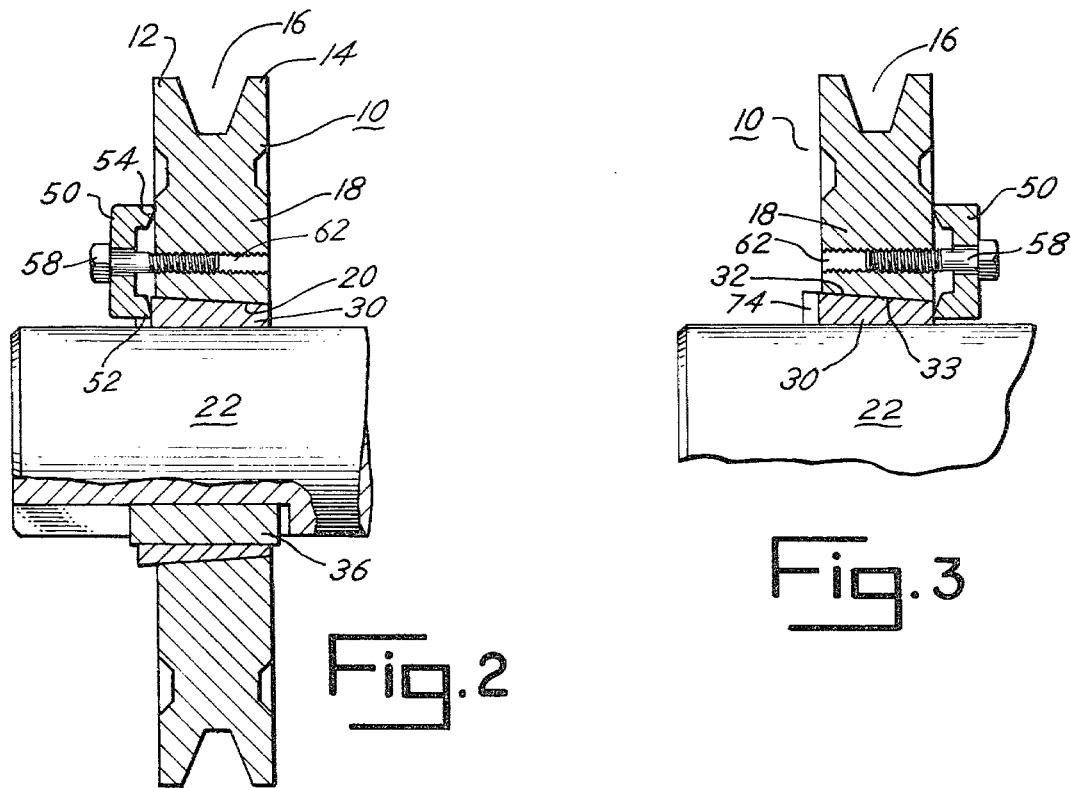

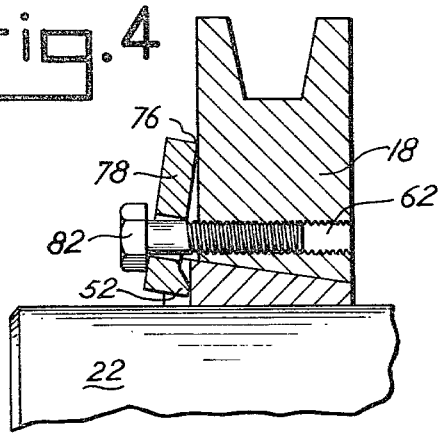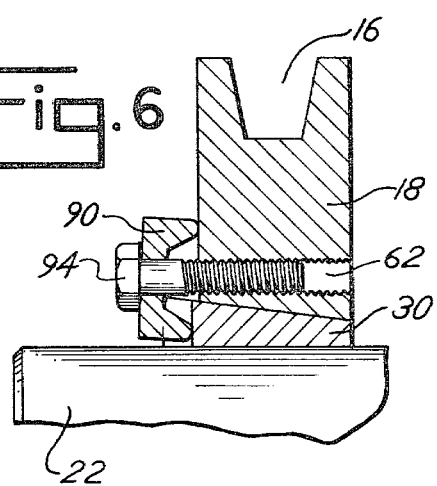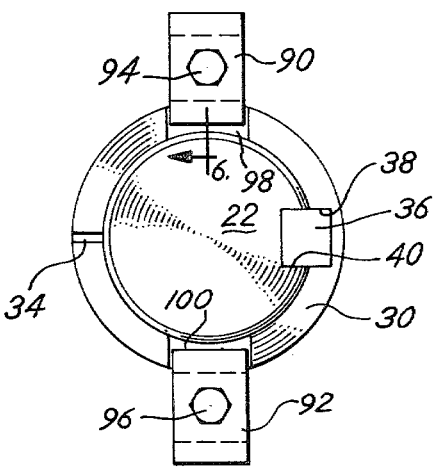

TAPERED BUSHING AND HUB ASSEMBLY FOR SHEAVES, GEARS, SPROCKETS, COUPLINGS AND SIMILAR MACHINE ELEMENTS

In the mechanical power transmission field, sheaves, pulleys, sprockets, gears, couplings and similar machine elements are often secured to rotatable shafts by a widely used mounting structure, consisting of a hub having a bore with an axially tapered inner surface concentric with and spaced from the shaft, and a split bushing disposed between the hub and shaft and having an outer tapered surface corresponding to the taper of the hub bore. A plurality of screws threaded into holes intersect the two tapered surfaces, and, when the screws are tightened, the two tapered surfaces are urged together, causing the two tapered surfaces to contact one another firmly and the split bushing to contract around and grip the shaft. In this construction, the screws, one on each side of the split in the bushing, are inserted into the holes, which are threaded only in the hub portion, and the inner end of the screws contact the end of the hole in the bushing, urging the bushing into the hub to secure the bushing on the shaft and the hub on the bushing. A third hole having the threaded portion in the bushing is often provided for removing the bushing from the hub when the sheave or other machine element is to be removed from the shaft. This construction for securing the driving or driven elements to a shaft will, under all normal operating conditions, hold the element securely on the shaft and prevent relative rotation between the shaft and element, and the hub and bushing will remain firmly in face to face contact with one another. However, this type of bushing and hub construction, using the screws which intersect the tapered surfaces, presents a rather difficult machining operation, and requires a bushing wall thickness sufficient to receive the bores and to permit effective machining and threading of the respective hole portions in the bushing and hub. It is therefore one of the principal objects of the present invention to provide a bushing and hub assembly for securing sheaves, gears, sprockets and similar machine elements on a shaft, which is relatively simple in construction and operation, and which can be fabricated with relatively easy machining operations.

Another object of the invention is to provide a tapered bushing assembly for securing a sheave, gear and similar machine elements to a shaft, which is so constructed and designed that the bushing can be made with relatively thin side walls and still effectively grip the shaft and seat on the tapered surface of the hub, and which can be easily and readily assembled in place on the shaft and in the hub using a simple technique and procedure.

Still another object of the invention is to provide a bushing assembly of the aforementioned type for securing a machine element to a shaft, which can be quickly removed from the shaft and machine element, and which can economically be fabricated using standard machining, boring and tapping operations and practices.

Further objects and advantages of the present invention will become apparent from the following description and accompanying drawings, wherein:

FIG. 1 is an end elevational view of a sheave and shaft, with the sheave being mounted on the shaft using the present bushing assembly;

FIG. 2 is a cross sectional view of the sheave and bushing assembly shown in FIG. 1, the section being taken on line 2—2;

FIG. 3 is a fragmentary cross sectional view similar to that shown in FIG. 2, but showing the manner in which the structure for removing the sheave from the shaft is used;

FIG. 4 is a fragmentary cross sectional view of a modified form of the bushing assembly, showing the manner in which it is used to mount a sheave on a shaft;

FIG. 5 is an end elevational view of a further modified form of the present bushing assembly; and FIG. 6 is a fragmentary cross sectional view of the modified form shown in FIG. 5, the section being taken on line 6—6 of the latter figure.

Referring more specifically to the drawings, and more particularly to FIG. 1 wherein one embodiment of the present invention is shown, numeral 10 designates generally a sheave of a single V-belt drive type having flanges 12 and 14 and a V-belt groove 16 at the periphery thereof, the sheave being disc shaped and having a hub 18 with an axial bore 20 for receiving a shaft 22 on which the sheave is mounted. The present invention is adaptable to various types of sheaves, gears, sprockets, couplings and similar machine elements, the sheave shown being merely for the purpose of illustrating the construction and operation of the bushing assembly for mounting the machine element on a shaft. The shaft may be a drive or a driven shaft, such as the shaft of a motor or other suitable power source, or it may be a driven shaft of equipment driven by a power transmission of which the sheave is a part. The hub of the sheave or other machine element usually can be readily identified from the remainder of the element, such as seen in FIGS. 1, 2 and 3; however, in other sheaves or machine elements, it may be formed as a continuous part of the complete element such as seen in FIGS. 4, 5 and 6. For the purpose of the present description, the hub will be considered that portion of the element involving the bushing securing members more fully described hereinafter.

The bushing assembly for mounting sheave 10 on shaft 22 consists of a bushing 30 insertable in bore 20 and on shaft 22. The external surface of the bushing is tapered, as indicated at numeral 32, and the wall of bore 20 has a corresponding taper. The bushing 30 contains a longitudinal and radial slit or slot 34 extending axially completely through the wall of the bushing to permit the bushing to contract around the shaft when it is assembled on the shaft with the sheave. The key 36 seated in keyways 38 and 40 in the bushing and shaft, respectively, prevents relative rotation or slippage between the bushing and shaft. The bushing is forced into the tapered bore 20, in the embodiment shown, by three lugs 42, 44 and 46 equally spaced around the bushing and the inner edge of the sheave hub at the larger end of the bore and bushing. Each lug consists of a body 50 having inwardly extending projections 52 and 54 for engaging the large end of the bushing 30 and the side of the sheave hub. The lugs are secured to the pulleys by screws 56, 58 and 60 threadedly received in holes extending inwardly, and preferably through, the body of the sheave, one such hole being indicated by numeral 62 for screw 58.

In mounting the sheave on the shaft, the sheave and bushing are slipped endwise on the shaft to the desired position with a key in the keyways as shown in FIG. 1. The lugs 42, 44 and 46 and their respective screws 56, 58 and 60 are tightened by the respective screws, preferably alternately from one to the other. As the screws are tightened, the bushing 30 is forced axially on the shaft and in bore 20, forcing the tapered surface 32 of the bushing against the tapered surface 33 of the bore. Extension 52 of the respective lug bears against the large end of the bushing and since the extension 54 prevents the other respective end of the lug from moving, extension 52 forces bushing 30 inwardly into the tapered bore. This procedure is continued with respect to the three lugs until the bushing is firmly seated on the shaft and in the tapered bore of the sheave hub. When the tightening of the screws 56, 58 and 60 is commenced, the lug is positioned angularly outwardly at the bushing and, as the seating of the bushing in bore 20 progresses, the outer surface of body 50 of the lug assumes a position substantially radial with respect to the shaft and bushing.

The bushing preferably extends laterally axially outwardly from the hub bore to provide, in effect, an outer flange 70. This flange is segmented to provide slots 72, 74 and 76 for receiving the inner end of the lugs and extensions 52. These slots facilitate alignment of the lugs with the bushing and assist in retaining the lugs in proper position throughout the operation of the sheave.

In order to disassemble the sheave from the shaft, screws 56, 58 and 60 and the respective lugs are removed from the sheave so that the sheave and bushing can be separated from one another. Since the bushing tends to freeze on the shaft and/or in bore 20 of the sheave when the sheave and shaft assembly have been used for prolonged periods of time, the bushing may be difficult to remove from the shaft and/or from the internal tapered surface of bore 20. To assist in disassembling the sheave and bushing, one or more of the lugs can be mounted on the opposite side of the sheave, with extension 52 of each lug engaging the small end of the bushing. The screws are then inserted in threaded holes 62 and, as they are tightened, extension 52 bears against the end of the bushing and moves the bushing and pulley relative to one another, thus separating the two elements and permitting the bushing to expand and be easily removed from the sheave and shaft. This operation is best seen in FIG. 3 where extension 54 is bearing against the right hand side of the sheave hub and extension 52 is bearing against the small end of bushing 30.

In the modification as shown in FIG. 4, the lug is not provided with extension 54 and the corner 76 of the body of the lug 78 bears against the side of the sheave, and extension 52 bears against the large end of the bushing. With this construction, tightening of the screw 82 causes extension 52 to force the bushing inwardly into the bore in the sheave. Lug 78 operates essentially the same as the lugs previously described herein, and a plurality of these lugs normally would be used. This type of lug can be used to remove the bushing in the same manner as illustrated in FIG. 3, with extension 52 bearing against the small end of the bushing as the screw is tightened in threaded hole 62 from the right hand side of the sheave hub as viewed in FIG. 4.

FIGS. 5 and 6 illustrate a modified form of the present invention; however, since the bushing assembly is essentially the same as that previously described, the same numerals will be used to identify the same parts. In this embodiment only two lugs are used instead of the three lugs illustrated in FIG. 1. In this modified form, lugs 90 and 92 are disposed diametrically opposite one another, and screws 94 and 96, respectively, attach the lugs to the sheave hub 18. The bushing has only two slots, 98 and 100, rather than three slots as in the previously described embodiment, but is otherwise the same as the one previously described containing split 34 and keyway 40. The bushing is assembled in the bore in the sheave and removed therefrom in the same manner as previously described herein with reference to the embodiments of FIGS. 1 through 4.

While only one embodiment and several modifications of the present tapered bushing and hub assembly have been described in detail herein, various other changes and modifications may be made without departing from the scope of the invention.

I claim:

1. A tapered bushing and hub assembly for mounting sheaves, gears, sprockets, couplings and similar machine elements on shafts, comprising a hub with a shaft bore having an annular tapered inner surface, a split bushing disposed in said hub and having an annular tapered outer surface for face-to-face contact with the tapered surface on said hub, a plurality of threaded holes spaced outwardly from said bushing and extending parallel with the axis of said bore, separate lugs for said holes having opposite ends, one end of which seating on the large end of said bushing and the other end of which seating on said hub, each of said lugs having a hole between the ends thereof, and screws extending through said holes in said lugs and threadedly received in said holes for pressing said lugs against said hub and bushing and thereby urging said bushing into said bore for contracting said bushing onto the shaft, the holes in said lugs being sufficiently larger than the respective screw to permit tilting of the lug relative to the screw as the screw presses the bushing into the hub.

2. A tapered bushing and hub assembly as defined in claim 1 in which three equally spaced holes are disposed in said hub and lugs are disposed on said hub for engagement with the large end of said bushing.

3. A tapered bushing and hub assembly as defined in claim 1 in which slots are provided in the large end of said bushing for receiving the contacting portion of said lugs.

4. A tapered bushing and hub assembly as defined in claim 2 in which slots are provided in the large end of said bushing for receiving the contacting portion of said lugs.

5. A tapered bushing and hub assembly as defined in claim 1 in which threaded holes extend completely through said hub for receiving a screw from the opposite end and for mounting a lug at the opposite end of the hole, for applying a force to the small end of the bushing to dislodge the bushing from the hub.

6. A tapered bushing and hub assembly as defined in claim 4 in which threaded holes extend completely through said hub for receiving a screw from the opposite end and for mounting a lug at the opposite end of the hole, for applying a force to the small end of the bushing to dislodge the bushing from the hub.

7. A tapered bushing and hub assembly as defined in claim 1 in which there are two axially disposed holes and respective lugs and screws arranged in diametrically opposite position with respect to one another for urging the bushing into said bore.

8. A tapered bushing and hub assembly as defined in claim 3 in which there are two axially disposed holes and respective lugs and screws arranged in diametrically opposite position with respect to one another for urging the bushing into said bore.

9. A tapered bushing and hub assembly as defined in claim 1 in which said bushing is split axially and longitudinally throughout its length and a keyway is disposed in said hub opposite said split.

* * * * *